United States Patent
Sakamoto

(10) Patent No.: US 8,863,179 B2
(45) Date of Patent: Oct. 14, 2014

(54) DIGITAL BROADCAST RECEIVER

(75) Inventor: Kunihiko Sakamoto, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1307 days.

(21) Appl. No.: 12/374,810

(22) PCT Filed: May 14, 2007

(86) PCT No.: PCT/JP2007/059869
§ 371 (c)(1),
(2), (4) Date: Jan. 23, 2009

(87) PCT Pub. No.: WO2008/012975
PCT Pub. Date: Jan. 31, 2008

(65) Prior Publication Data
US 2009/0322945 A1 Dec. 31, 2009

(30) Foreign Application Priority Data
Jul. 24, 2006 (JP) ................................. 2006-200565

(51) Int. Cl.
*G06F 3/00* (2006.01)
*G06F 13/00* (2006.01)
(Continued)

(52) U.S. Cl.
CPC ............. *H04N 5/44591* (2013.01); *H04N 5/45* (2013.01); *H04N 21/4438* (2013.01); *H04N 21/4782* (2013.01); *H04N 21/4435* (2013.01); *H04N 5/782* (2013.01)
USPC ......................................................... 725/37

(58) Field of Classification Search
CPC .......... H04N 21/2183; H04N 21/8173; H04N 21/41407; H04N 21/4147; H04N 21/6582; H04N 21/4435; H04N 21/4438; H04N 21/4782
USPC ......... 725/58, 43, 112, 13, 37, 52, 38, 25, 61; 715/781–808, 718; 348/564–565, 588, 348/731, 446, 448, 452; 705/51
See application file for complete search history.

(56) References Cited

U.S. PATENT DOCUMENTS 6,049,333 A * 4/2000 LaJoie et al. .................. 715/718
6,285,407 B1 9/2001 Yasuki et al.
(Continued)

FOREIGN PATENT DOCUMENTS

EP 1321924 A1 6/2003
JP 10-174007 A 6/1998
(Continued)

*Primary Examiner* — Nasser Goodarzi
*Assistant Examiner* — An Nguyen
(74) *Attorney, Agent, or Firm* — Birch, Stewart, Kolasch & Birch, LLP

(57) ABSTRACT

When display according scheduled program viewing is provided on multi-screen display, a user may not even notice the display. First, upon the start of processing for display according to scheduled program viewing, which has been set in advance (for example, two minutes before the scheduled program viewing), at step S1, whether or not TV is currently providing multi-screen display is determined at step S2. If it is providing multi-screen display (Yes), the processing proceeds to step S3, and the display is switched to single-screen display. If it is not providing multi-screen display (No), step S3 is omitted. In any case, the processing proceeds to step S4. At step S4, whether or not an HTML browser is installed is determined, and if it is not installed (No), the processing proceeds to step S7. If it is installed (Yes), the processing proceeds to step S5, and whether or not the HTML browser is active is determined. If it is not active (No), the processing proceeds to step S7, and if it is active (Yes), the processing proceeds to step S6, and the memory area assigned to the HTML browser is released, and then processing proceeds to step S7. At step S7, whether or not the BML browser is active is determined. If it is not active (No), the processing proceeds to step S9, and if it is active (Yes), the processing proceeds to step S8, and the memory area assigned to the BML browser is released, and the processing proceeds to step S9. At step S9, the channel for the program scheduled to be viewed is selected, and at step S10, a memory area necessary for the BML browser is secured. Next, the BML browser is activated, and the processing is terminated (step S11).

8 Claims, 7 Drawing Sheets

(51) Int. Cl.
*H04N 5/445* (2011.01)
*H04N 5/45* (2011.01)
*H04N 21/443* (2011.01)
*H04N 21/4782* (2011.01)
*H04N 5/782* (2006.01)

(56) References Cited

U.S. PATENT DOCUMENTS

| | | | |
|---|---|---|---|
| 6,469,753 | B1 | 10/2002 | Klosterman et al. |
| 7,263,711 | B1 * | 8/2007 | Estipona ............... 725/112 |
| 2001/0001160 | A1 | 5/2001 | Shoff et al. |
| 2001/0034882 | A1 * | 10/2001 | Yuzawa ............... 725/13 |
| 2002/0059144 | A1 * | 5/2002 | Meffert et al. ............... 705/51 |
| 2005/0235319 | A1 * | 10/2005 | Carpenter et al. ............... 725/52 |

FOREIGN PATENT DOCUMENTS

| | | |
|---|---|---|
| JP | 10-191188 A | 7/1998 |
| JP | 11-32262 A | 2/1999 |
| JP | 2002-353780 A | 12/2002 |
| JP | 6-54269 A | 2/2004 |
| JP | 2005-124047 A | 5/2005 |
| JP | 2005-244716 A | 9/2005 |
| JP | 2006-33548 A | 2/2006 |
| WO | WO03/091985 A1 | 11/2003 |

* cited by examiner

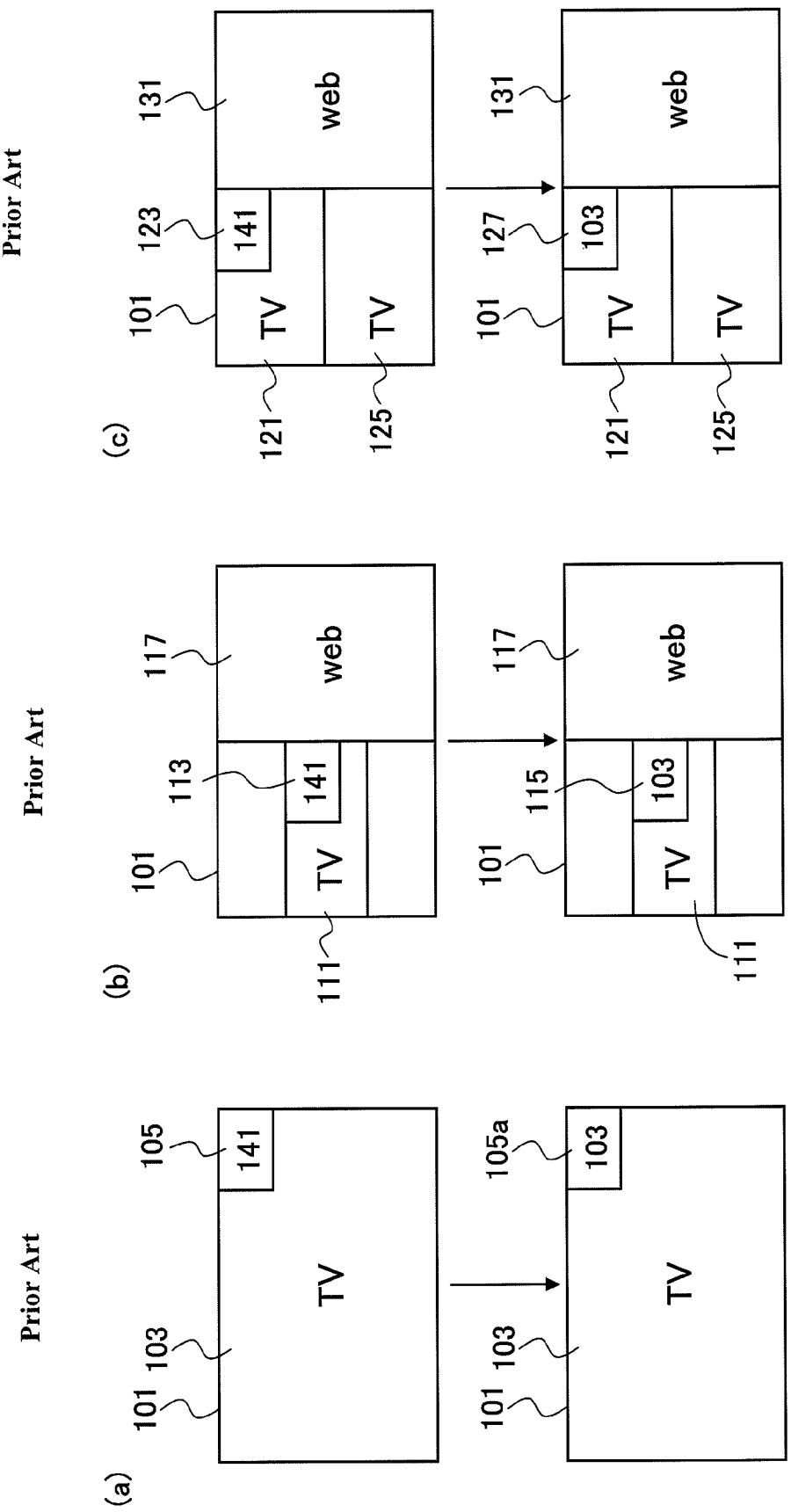

DIGITAL BROADCAST RECEIVER

TECHNICAL FIELD

The present invention relates to a digital broadcast receiver, and specifically relates to a display control technique related to multi-screen display when a program is scheduled to be viewed.

BACKGROUND ART

Since analog broadcast receivers had predominated, techniques for displaying plural programs on one display unit have been used. Furthermore, at the present time when digital broadcast receivers are becoming mainstream, devices capable of multi-screen display are growing popular. For example, for the digital broadcast receiver disclosed in patent document 1, patent document 1 discloses a technique for displaying two screens of a TV display screen and an Internet screen and also discloses a technique for smoothly switching these screens (for example, see patent document 1). In the technique disclosed in patent document 1, each time dual-screen display is started, a screen for selecting a video signal combination type for the dual-screen display is displayed, and dual-screen display according to the selection is executed. Also, patent document 1 proposes that: when dual-screen display is started, screen display according to a preset video signal combination is executed; and switching of contents on the dual-screen display from that state, and switching to single-screen display are cyclically performed.

Patent Document 1: JP Patent Publication (Kokai) No. 2005-244716 A

DISCLOSURE OF THE INVENTION

Problems to be Solved by the Invention

FIG. 6 is a diagram illustrating an example of switching of TV screen display using a multi-screen display technique. For example, a TV display screen 401 can provide arbitrary screen display within its determined maximum number of display screens for the Web and TV, from, e.g., single-screen display 401 for TV to triple-screen display 217, 221 and 215 for TV and the Web via dual-screen display 205 and 207, single-screen display 211 for the Web, and dual-screen display 213 and 215 for TV and the Web.

Also, FIGS. 7(a) to (c) are diagrams illustrating typical examples of display switching according to a multi-screen display technique for a digital broadcast receiver. For example, when a program 141 on channel 141, which is indicated in an area 105 of a display screen 101, is viewed as shown in FIG. 7(a), upon switching the channel to channel 103 (105a), the program display 103 resulting from the switching is provided on the display screen 101. This example is one in which a channel on which a program is viewed is switched to another in single-screen display. As shown in FIG. 7(b), a TV program 111 on channel 141 and display 117 obtained via a Web browser are provided on the display screen 101. Here, when a viewed program is switched to one on channel 103, the display 117 via the Web browser is kept as it is, and the program is displayed as the program 111 (program ID changing as a result of switching), and the program 141 is made to go into non-display. This example is one in which in dual-screen display, one screen is a Web-based screen and the channel of the program on the other screen is switched to another. FIG. 7(c) is a diagram illustrating an example of the case where dual-screen TV display and single-screen Web display are provided. On the display screen 101, dual-screen display for programs on TV 121 and TV 125, and Web browser-based display 131 are provided. When the program 141 is switched to the program 103, displays on the other screens are kept in their respective previous states, the program 141 is switched to the program 103. This example is one in which one screen for a program in triple-screen display including the Web is changed.

When a user wishes to view a program scheduled to be viewed on the whole screen, as in the example shown in FIG. 7(c), he/she has to cancel the triple-screen display via an instruction. However, when only one screen from among the three screens is changed, the user may not even notice the change. In addition, when data broadcasting is made available in a program scheduled to be viewed, while display via an HTML browser being provided, a problem arises in that it is necessary that memory for the HTML browser, which is used for the Internet, and memory for a BML browser used for TV, which employs a description language for data broadcasting and is used for BS digital broadcasting, 110 CS digital broadcasting and digital terrestrial broadcasting be separately provided in one apparatus.

Also, where a configuration in which a HTML browser and a BML browser share the same memory area is provided, if the HTML browser is active at the time of start of scheduled program viewing, the BML browser cannot be activated, causing a problem in that data broadcasting for the program scheduled to be viewed cannot be enjoyed.

An object of the present invention is to reduce the memory capacity required for multi-screen display when a program is scheduled to be viewed, in an apparatus capable of performing processing for scheduling program viewing during multi-screen display having a configuration in which the Internet and TV broadcasting can coexist.

Means for Solving the Problems

An aspect of the present invention provides a broadcast receiver capable of providing multi-screen display on a display unit, characterized by comprising a display control unit that performs display control to make at least any of screen displays that are different from a screen display for a relevant program scheduled to be viewed go into non-display at a point of time when a time for starting display according to scheduled program viewing approaches during multi-screen display. It also provides a broadcast receiver capable of providing multi-screen display on a display unit, characterized by comprising a display control unit that performs display control to make all of screen displays that are different from a screen display for a relevant program scheduled to be viewed go into non-display at a point of time when a time for starting display according to scheduled program viewing approaches during multi-screen display. Consequently, it is possible to inform a user of display of a program scheduled to be viewed.

The screen displays that are made to go into non-display may include a screen display via a Web browser. In this case, it is preferable that the display control unit preferentially make the screen display via a Web browser go into non-display. Also, it is favorable that when making the screen display via a Web browser go into non-display, a memory area for the Web browser is released and assigned as a memory area for program display.

Another aspect of the present invention provides a display control method for a broadcast receiver capable of providing multi-screen display, characterized by comprising the step of making at least one program from among programs that are currently being displayed go into non-display at a point of time when a scheduled program viewing start time approaches during multi-screen display, and displaying a relevant program scheduled to be viewed with the display of the relevant program enlarged to the area in which the at least one program has gone into non-display. It is preferable the method further comprises the steps of: determining whether or not the screen display of the at least one program to be gone into non-display includes a screen display via a Web browser; and preferentially making the screen display via a Web browser go into non-display. Also, it is preferable to, when making the screen display via a Web browser go into non-display, perform the step of releasing a memory area for the Web browser and assigning it as a memory area for program display. The present invention may be a program for making a computer execute the above-described method.

Advantages of the Invention

According to the present invention, when program display is switched to another according to scheduled program viewing, whether or not the screen display includes display via the Web is determined, and if it includes display via the Web, the memory area assigned to an HTML browser is released, and secured as a memory area necessary for a BML browser, providing an advantage in that a memory area can effectively used. Furthermore, the number of display screens on a display unit is reduced, and preferably, reduced only to display of a program scheduled to be viewed, enabling a user to be informed of start of the program scheduled to be viewed.

BRIEF DESCRIPTION OF THE DRAWINGS

FIGS. 7(a) to (c) are diagrams illustrating common examples of display switching according to a multi-screen display technique for a digital broadcast receiver.

DESCRIPTION OF SYMBOLS

A . . . digital broadcast receiver, 1 . . . antenna, 3 . . . front-end circuit (A), 5 . . . demultiplexer (A), 7 . . . picture and sound decoding unit (A), 11 . . . front-end circuit (B), 15 . . . demultiplexer (B), 17 . . . picture and sound decoding unit (B), 21 . . . screen combining unit, 23 . . . RAM, 24 . . . timer, 25 . . . ROM, 27 . . . control unit (CPU), 31 . . . HTML browser, 32 . . . BML browser, 33 . . . sound switching unit, 35 . . . display unit, 37 . . . sound output unit (A), 41 . . . sound output unit (B), 45 . . . remote controller light receiving unit.

BEST MODE FOR CARRYING OUT THE INVENTION

Figure 1:
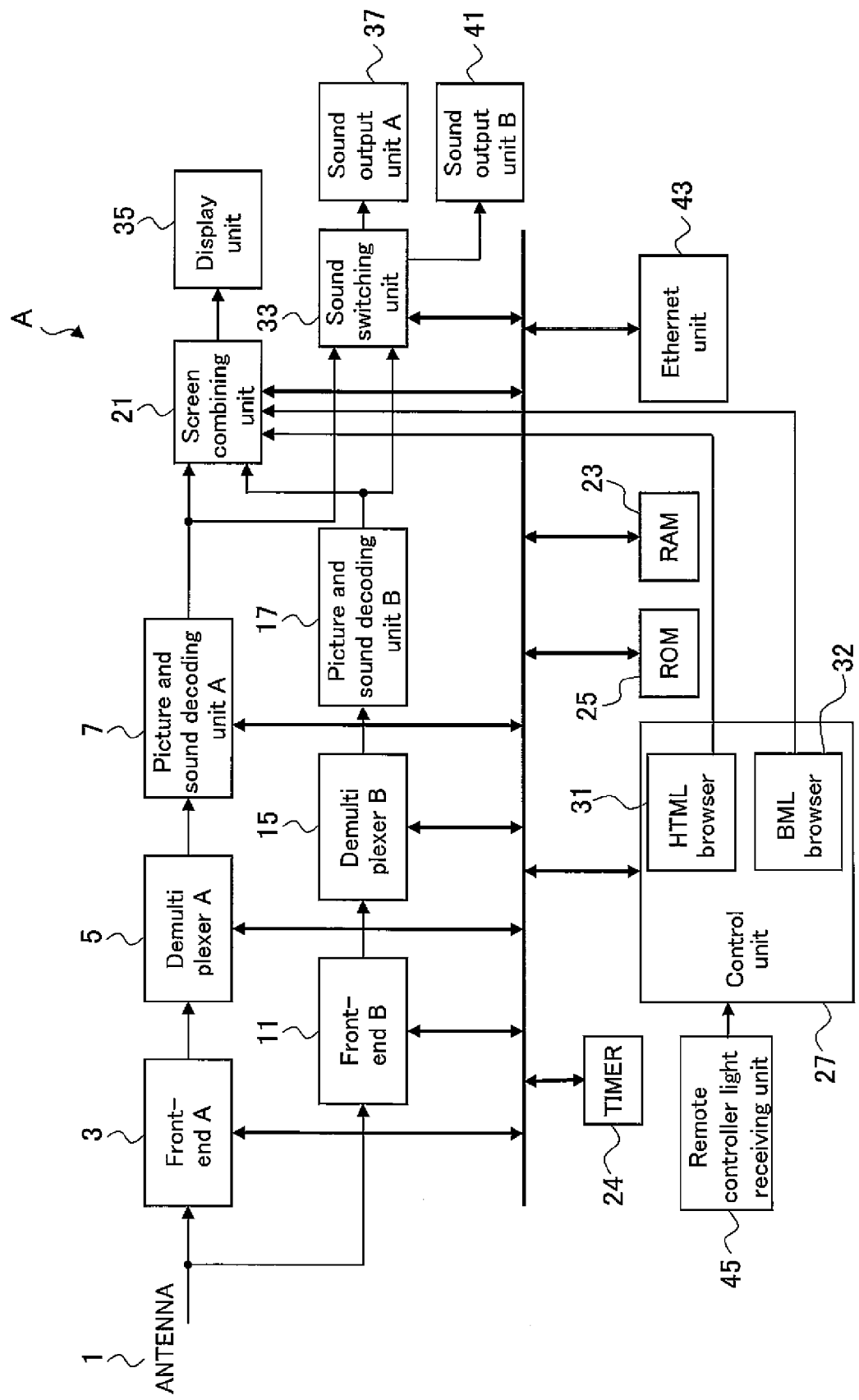
FIG. 1 is a functional block diagram illustrating an example configuration of a digital broadcast receiver according to an embodiment of the present invention.

Hereinafter, a digital broadcast receiver according to an embodiment of the present invention will be described with reference to the drawings. FIG. 1 is a function block diagram illustrating an example configuration of a digital broadcast receiver according to the present embodiment. As shown in FIG. 1, a digital broadcast receiver A according to the present embodiment includes an antenna 1, a front-end circuit (A)3, a demultiplexer (A)5, a picture and sound decoding unit (A)7, a front-end circuit (B)11, a demultiplexer (B)15, a picture and sound decoding unit (B)17, and a timer 24 so that it can provide multi-screen display. In each of the front-end circuits, a tuner circuit, an IF demodulating circuit and a DC/DC converter circuit are integrated. Inputs from these two lines are combined by means of a screen combining unit 21 and displayed on a display screen 35, and in a sound switching unit 33, they are output to a sound output unit (A)37 and a sound output unit (B)41.

In a common configuration, the digital broadcast receiver further includes a ROM 25 that stores programs, etc., and a RAM 23 that develops the programs and performs high-speed processing, a control unit (CPU) 27 that performs the overall control, and a remote controller light receiving unit 45 that receives signals from a remoter controller. In addition, the digital broadcast receiver is provided with an Ethernet unit 43, and the control unit 27 is provided with an HTML browser 31 and a BML browser 32, enabling, e.g., obtaining contents via the Internet (NT) and displaying them on the display screen 35, in addition to display based on programs received by the digital broadcast receiver A. However, since both a BML browser and an HTML browser for a digital broadcast receiver require a large area in the RAM 23, they cannot be used at the same time. During the HTML browser being active, the data coupling function of digital broadcasting cannot be used. Scheduling of a program to be viewed is performed via a remote controller light receiving unit 45 based on instructions from a remote controller. Although, here, a description is given in terms of a digital TV as an example, it should be understood that, e.g., analog TVs, digital and analog-mixed TVs, TV on PCs, TV function-equipped mobile terminals fall within the scope of the present invention.

Figure 2:
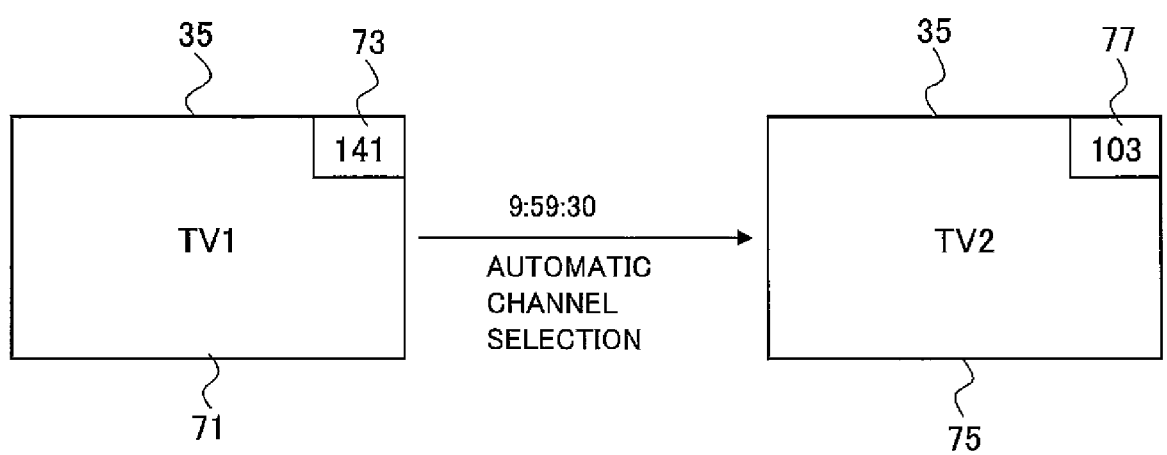
FIG. 2 is a diagram illustrating an example of screen display when a program is scheduled to be viewed.

FIG. 2 is a diagram illustrating an example of display screen when a program is scheduled to be viewed. As shown in FIG. 2, when screen display of a TV program 71 on channel 141, which is indicated in a TV channel display area 73, is provided on the display screen 35, if a TV program on channel 103 is scheduled to be viewed from 10:00, upon, for example, the timer 24 detecting that the time has reached the time 30 seconds before 10:00, display of a TV program 75, which is going to be viewed, and automatic channel selection to select channel 103, which is indicated in a TV channel display area 77, are performed in advance. As described above, as a result of selecting the channel for a program scheduled to be viewed in advance, it is possible to unfailingly view the program scheduled to be viewed, at the actual time for the scheduled program viewing.

Figure 3:
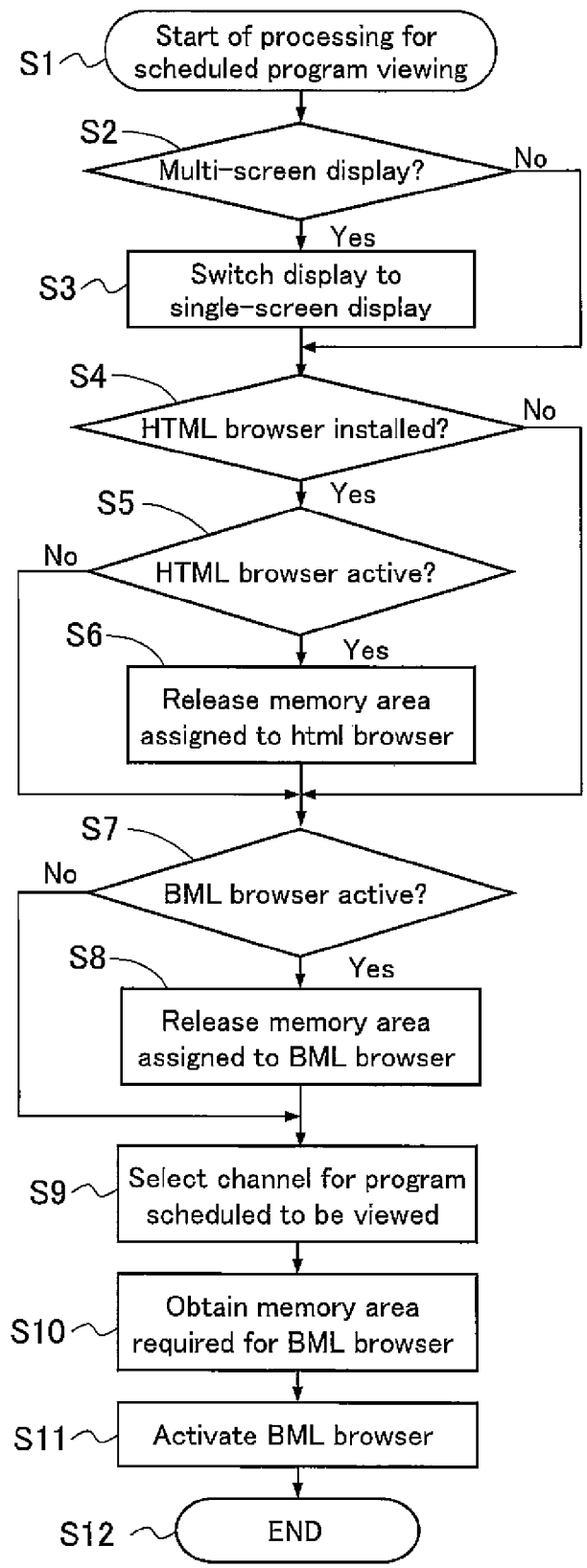
FIG. 3 is a flowchart illustrating an example of the flow of screen display control processing according to an embodiment of the present invention.
Figure 4:
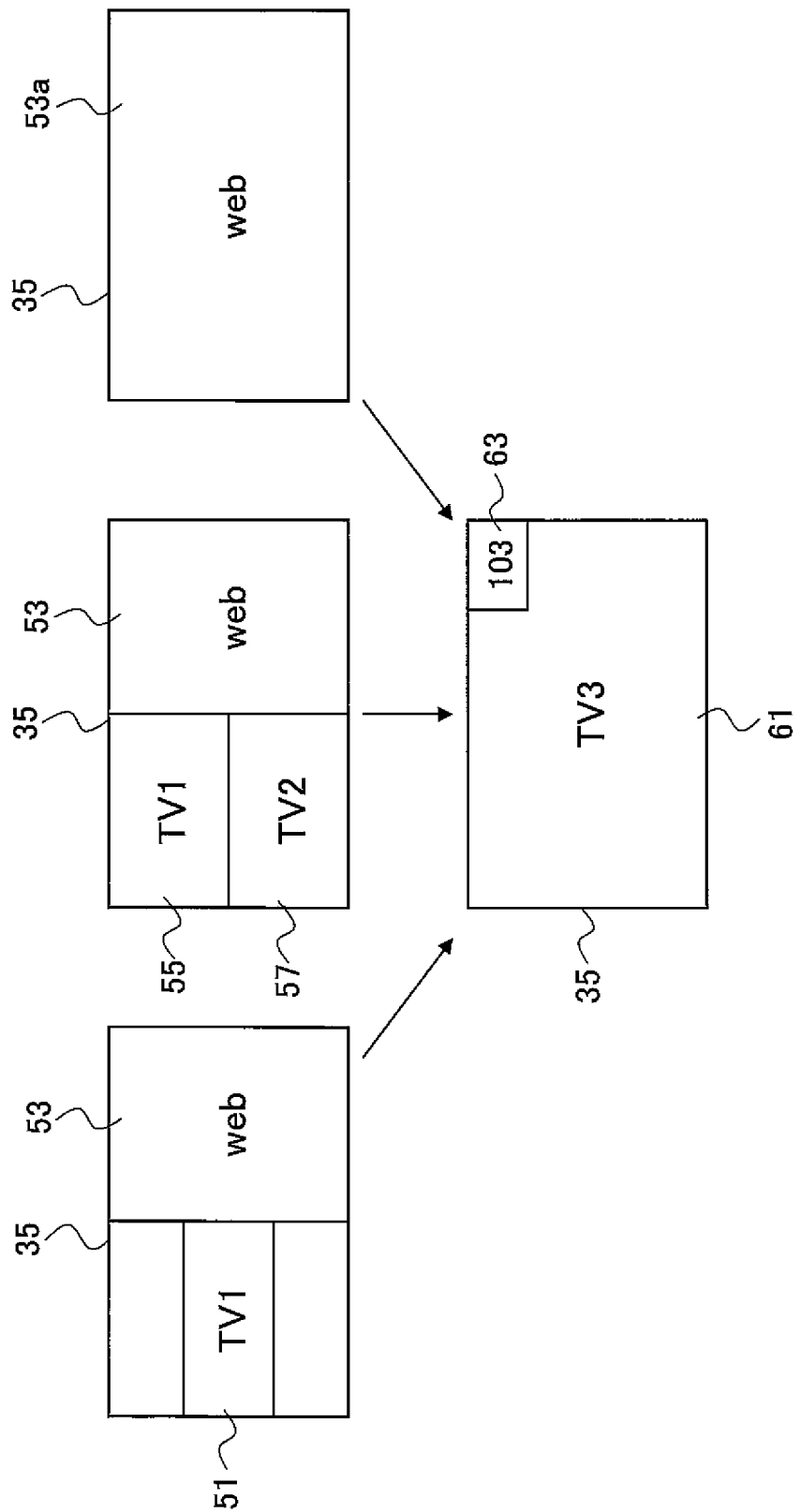
FIG. 4 is a diagram illustrating examples of screen display for scheduled program viewing according to a multi-screen display technique of an embodiment of the present invention, which applies the technique shown in FIG. 2 and follows the flow of processing shown in FIG. 3.

FIG. 3 is a flowchart illustrating an example of the flow of screen display control processing according to the present embodiment, and FIG. 4 is a diagram illustrating examples of screen display for scheduled program viewing according to a multi-screen display technique of the present embodiment, which applies the above-described technique shown in FIG. 2 and follows the flow of processing shown in FIG. 3.

As shown in FIG. 3, first, upon the start of processing for display according to scheduled program viewing, which has been set in advance (for example, two minutes before the scheduled program viewing), at step S1, whether or not TV is currently providing multi-screen display is determined at step S2. If it is providing multi-screen display (Yes), the processing proceeds to step S3, and the display is switched to single-screen display. If it is not providing multi-screen display (No), step S3 is omitted. In any case, the processing proceeds to step S4. At step S4, whether or not an HTML browser is installed is determined, and if it is not installed (No), the processing proceeds to step S7. If it is installed (Yes), the processing proceeds to step S5, and whether or not the HTML browser is active is determined. If it is not active (No), the processing proceeds to step S7, and if it is active (Yes), the processing proceeds to step S6, and the memory area assigned to the HTML browser is released, and then processing proceeds to step S7. At step S7, whether or not the BML browser is active is determined. If it is not active (No), the processing proceeds to step S9, and if it is active (Yes), the processing proceeds to step S8, and the memory area assigned to the BML browser is released, and the processing proceeds to step S9. At step S9, the channel for the program scheduled to be viewed is selected, and at step S10, a memory area necessary for the BML browser is secured. Next, the BML browser is activated, and the processing is terminated (step S12).

In FIG. 4, three different drawings are shown on the upper side. Each drawing shows an example of screen display change according to scheduled program viewing when one screen display or two or more screen display including Web display is provided. The screen display can transit from those in the upper side to a screen display on the lower side as indicated by arrows, following the flow of processing shown in FIG. 3. The upper left screen is an example of dual-screen display in which TV1 display 51 and Web display 53 are provided on the display screen 35, and by means of cancelling the Web display, the screen display is switched to single-screen display 61 for TV3 as shown in the lower drawing. Here, an area 63 indicates the channel number for TV3 on which a program is scheduled to be viewed, which is indicated by 103.

The upper middle drawing illustrates an example of triple-screen display in which a TV1 screen 55, a TV2 screen 57 and a Web screen 53 are displayed on the display screen 35. Also in this case, as described above, by means of, e.g., automatically switching the channel to the selected channel before the scheduled program viewing, the display on display screen 35 is switched to the single-screen display 61 for TV3 on which a program is scheduled to be viewed, which is indicated by 103 in the area 63. In this case, single-screen display is not necessarily provided, and display control may be performed so that: two screens consisting of one screen for the program scheduled to be viewed and the other screen; and the display of the one screen for the program scheduled to be viewed is enlarged. A program from among the programs other than the program scheduled to be viewed, or the Web to be left may be determined by a user's designation, or may also be determined by settings made in advance. In general, it is preferable to make the Web go into non-display because this can provide the advantage of being able to solve the program of the browser's occupation of memory.

The upper right drawing illustrates an example of single-screen display in which a Web screen 53a is displayed on the display screen 35. Also in this case, as described above, by means of, e.g., automatically switching the channel to the selected channel before the scheduled program viewing, the display on the display screen 35 is switched to single-screen display 61 for TV3 on which the program is scheduled to be viewed, which is indicated by 103 in the area 63, and the Web is made to go into non-display.

As described above, when program display is changed according to scheduled program viewing, whether or not screen display including Web display is being provided is determined, and if the screen display includes display via the Web, the memory area assigned to the HTML browser is released, and secured as memory area necessary for the BML browser, providing an advantage in that a memory area can effectively used. Furthermore, the number of display screens on the display unit is reduced and preferably reduced only to display of the program scheduled to be viewed, enabling a user to be informed of start of the scheduled program viewing. For the information method, the above is a fine one in which the screen is not covered by characters, etc., and characters, etc., indicating the start of the scheduled program viewing can be displayed on the display screen.

Figure 5:
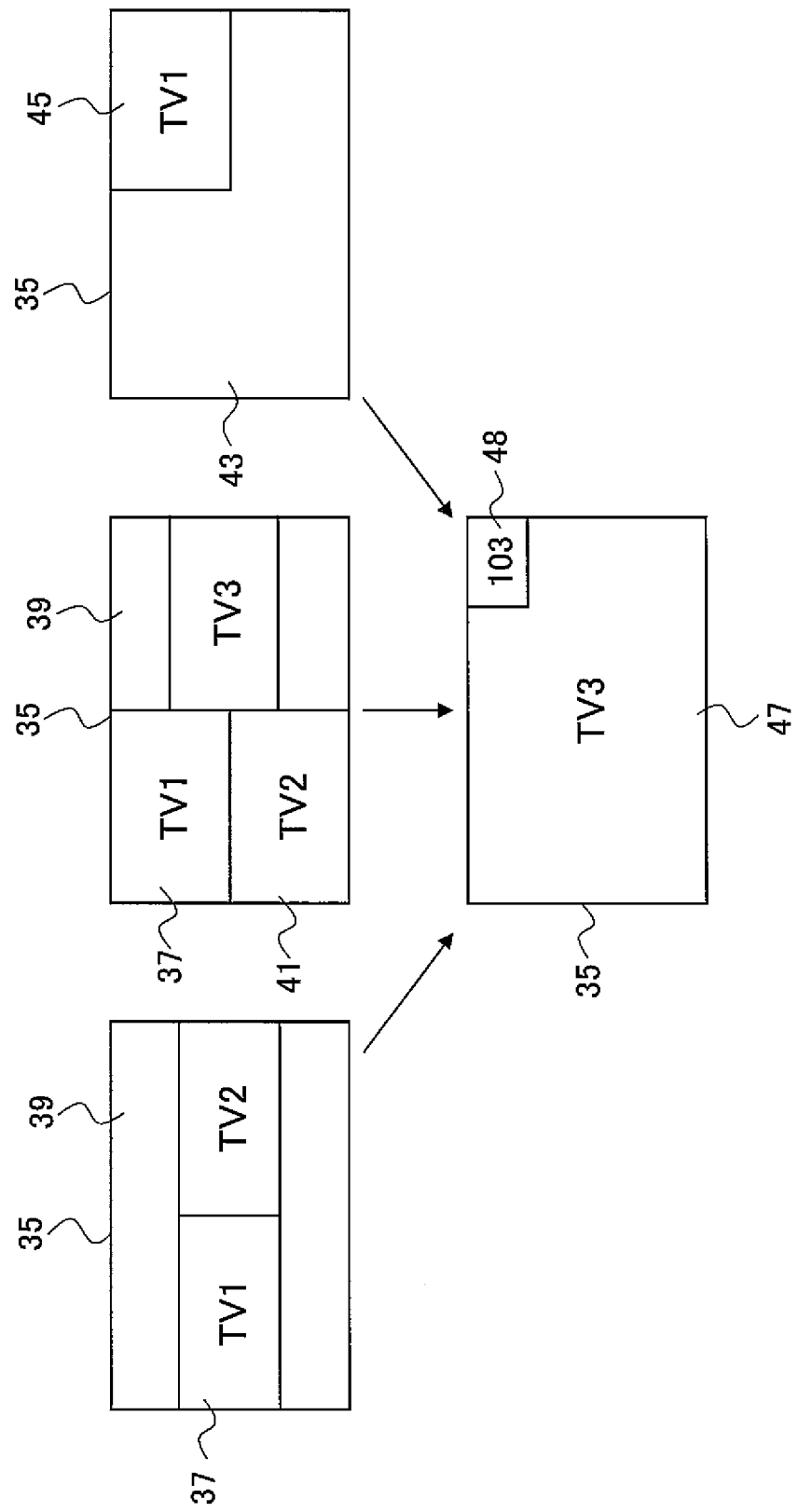
FIG. 5 is a diagram illustrating examples of screen display according to a modification of an embodiment of the present invention, which is a diagram illustrating another display example shown in such a manner that it can be compared with FIG. 4.
Figure 6:
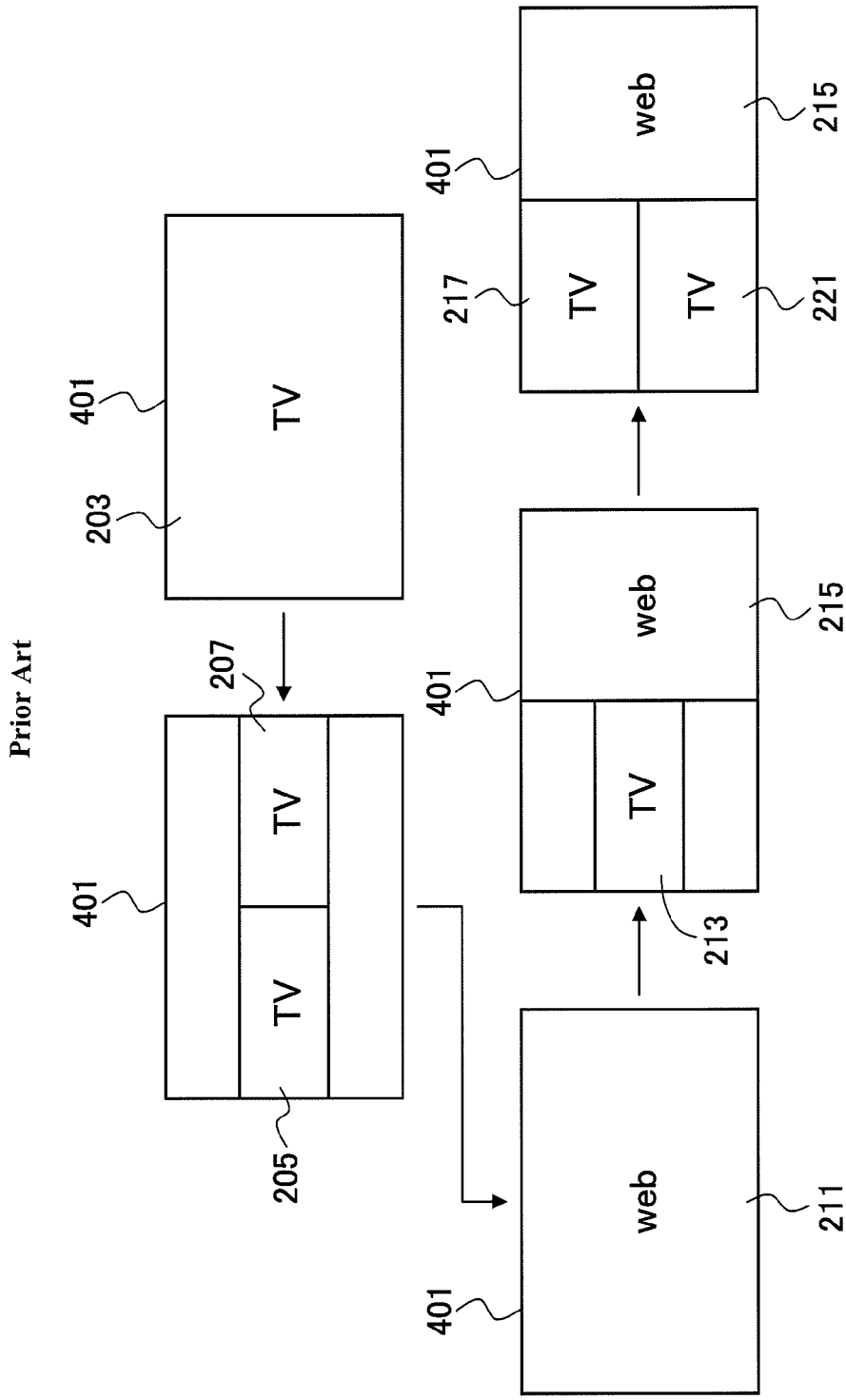
FIG. 6 is a diagram illustrating an example of common TV screen display switching using a multi-screen display technique.

FIG. 5 is a diagram illustrating examples of screen display for scheduled program viewing in a multi-screen display technique according to a modification of the above-described technique shown in FIGS. 3 and 4. In FIG. 5, three different drawings are shown on the upper side. Each drawing shows an example of screen display before switching according to scheduled program viewing, which includes no Web screen. The screen display can transit from the upper side to the screen display example shown on the lower side as indicated by the arrows. The upper left screen is an example of dual-screen display in which TV1 display 37 and TV2 display 39 are provided on the display screen 35, and by means of, e.g., automatically switching the channel to the selected channel before the scheduled program viewing, the display on the display screen 35 is switched to single-screen display 47 for TV3 on which a program is scheduled to be viewed, which is indicated by 103 in an area 48. If the TV1 display 37 or the TV2 display 39 shows the same channel as that for the program scheduled to be viewed, the channel is not switched, the display is switched to single-screen display, and screen display other than that for scheduled program viewing is made to go into non-display, before the scheduled program viewing.

The upper middle drawing illustrates triple-screen display in which the TV1 screen 37, the TV2 screen 41 and a TV3 screen 39 are displayed on the display screen 35. Also in this case, as described above, by means of, e.g., automatically switching the channel to the selected channel before the scheduled program viewing, the display on the display screen 35 is switched to the single-screen display 47 for TV3 on which the program is scheduled to be viewed, which is indicated by 103 in the area 48. In this case, single-screen display is not necessarily provided, and display control may be performed so that: two screens consisting of one screen for the program scheduled to be viewed and the other screen; and the display of the one screen for the program scheduled to be viewed is enlarged. A program from among the programs other than the program scheduled to be viewed, or the Web to be left may be determined by a user's designation, or may also be determined by settings made in advance.

The upper right drawing illustrates an example of single-screen (sub-screen) display in which a TV1 screen 45 is displayed on the display screen 35. Also in this case, as described above, by means of, e.g., automatically switching the channel to the selected channel before the scheduled program viewing, the display on the display unit 35 is switched to single-screen display 47 for TV3 on which a program is scheduled to be viewed, which is indicated by 103 in the area 48. In this case, there is an advantage of enabling a user to be informed of start of the program scheduled to be viewed, in a fine method, as a result of switching the sub-screen display to full-screen display.

Although the above embodiment has been described in terms of a digital broadcast receiver as an example, it should be understood that analog broadcasting may be mixed.

INDUSTRIAL APPLICABILITY

The present invention can be employed for a digital broadcast receiver capable of multi-screen display.

The invention claimed is:

1. A broadcast receiver capable of providing multi-screen display on a display unit, the broadcast receiver comprising:
   a display control unit that performs display control to make all screen displays that are different from a screen display for a relevant program scheduled to be viewed go into non-display at a point of time when a time for starting display according to scheduled program viewing approaches during multi-screen display, wherein
   the screen displays that are made to go into non-display include a screen display via a Web browser, and
   when making the screen display including all screen displays that are different from a screen display for the relevant program scheduled to be viewed including the Web browser to into non-display, a memory area previously allocated for the Web browser is released and assigned as a memory area for display of the relevant program scheduled to be viewed.

2. The broadcast receiver according to claim 1, wherein the display control unit makes the screen display via a Web browser go into non-display preferentially.

3. The broadcast receiver according to claim 1, wherein the display control unit performs control to provide enlarged display of a remaining program using the area in which the screen displays have gone into non-display.

4. The broadcast receiver according to claim 1,
   the Web browser is an HTML browser, and
   the relevant program scheduled to be viewed a BML browser.

5. A display control method for a broadcast receiver capable of providing multi-screen display, the display control method comprising the steps of:
   making all programs that are currently being displayed on an area of multi-screen display go into non-display at a point of time when a scheduled program viewing start time approaches during the multi-screen display;
   displaying a relevant program scheduled to be viewed with the display of the relevant program enlarged to the area in which said all programs had gone into non-display;
   determining whether or not the screen display that has gone into non-display includes a screen display via a Web browser;
   making the screen display via the Web browser to into non-display preferentially; and
   when making the screen display via Web browser go into non-display, releasing a memory area previously allocated for the Web browser and assigning it as a memory area for display of the relevant program scheduled to be viewed.

6. The method according to claim 5, wherein
   the displaying the relevant program includes displaying the relevant program via a BML browser, and
   the Web browser is an HTML browser.

7. A non-transitory computer-readable medium having instructions stored thereon, such that when the instructions are read and executed by a processor, the processor is configured to perform a method, the method comprising:
   making all programs that are currently being displayed on an area of multi-screen display go into non-display at a point of time when a scheduled program viewing start time approaches during the multi-screen display;
   displaying a relevant program scheduled to be viewed, with the display of the relevant program enlarged to the area in which said all programs had gone into non-display;
   determining whether or not the screen display that has gone into non-display includes a screen display via a Web browser;
   making the screen display via the Web browser go into non-display preferentially; and
   when making the screen display via the Web browser go into non-display, releasing a memory are previously allocated for the Web browser and assigning it a memory area for display of the relevant program scheduled to be viewed.

8. The non-transitory recording computer-readable medium according the claim 7, wherein
   the display the relevant program includes displaying the relevant program via a BML browser, and
   the Web browser is an HTML browser.

* * * * *